(12) United States Patent  
Raeford, Sr.

(10) Patent No.: US 6,331,121 B1
(45) Date of Patent: Dec. 18, 2001

(54) APPARATUS FOR ARRANGING ELECTRICAL CORDS

(76) Inventor: James E. Raeford, Sr., P.O. Box 571, Davidson, NC (US) 28036

( * ) Notice: Subject to any disclaimer, the term of this patent is extended or adjusted under 35 U.S.C. 154(b) by 0 days.

(21) Appl. No.: 09/569,457

(22) Filed: May 12, 2000

(51) Int. Cl.[7] ................................................. H01R 13/72
(52) U.S. Cl. ........................... 439/501; 174/67; 191/12.4
(58) Field of Search .................... 439/20, 21, 22, 439/27, 501, 369; 174/67, 53; 160/107; 191/12.4

(56) References Cited

U.S. PATENT DOCUMENTS

| D. 313,165 | 12/1990 | Kovacik et al. . | |
|---|---|---|---|
| 3,346,705 | * 10/1967 | Slinkard et al. | 191/12.4 |
| 3,826,879 | 7/1974 | Penn et al. . | |
| 4,904,189 | * 2/1990 | Hallings | 439/13 |
| 5,214,368 | * 5/1993 | Wells | 320/2 |
| 5,236,371 | * 8/1993 | Matthis | 439/501 |
| 5,265,815 | 11/1993 | Soyka et al. . | |
| 5,379,903 | 1/1995 | Smith . | |
| 5,518,417 | * 5/1996 | Liu | 439/501 |
| 5,690,198 | 11/1997 | Lohr . | |
| 5,701,981 | 12/1997 | Marshall et al. . | |
| 5,723,815 | * 3/1998 | Pena | 174/53 |
| 5,773,757 | * 6/1998 | Kenney et al. | 174/53 |
| 5,848,701 | * 12/1998 | Riccabona | 206/702 |
| 6,076,759 | * 6/2000 | Simonson | 242/405.3 |

* cited by examiner

Primary Examiner—Tho D. Ta
Assistant Examiner—James Harvey

(57) ABSTRACT

An apparatus for arranging electrical cords for storing the cords of electrical devices between uses of the electrical devices and dispensing the electrical cord from the housing during use of the electrical device. The apparatus for arranging electrical cords includes a housing including an interior, a shaft and at least one cord reeling assembly both mounted in the interior of the housing, and a pair of cord spools mounted on the shaft.

18 Claims, 3 Drawing Sheets

APPARATUS FOR ARRANGING ELECTRICAL CORDS

BACKGROUND OF THE INVENTION

1. Field of the Invention

The present invention relates to cord handling systems and more particularly pertains to a new apparatus for arranging and storing electrical cords of electrical devices between uses of the electrical devices and dispensing the electrical cord from the housing during use of the electrical device.

2. Description of the Prior Art

The use of cord handling systems is known in the prior art. More specifically, cord handling systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,379,903; U.S. Pat. No. 5,690,198; U.S. Pat. No. 5,701,981; U.S. Pat. No. 3,826,879; U.S. Pat. No. 5,265,815; and U.S. Pat. No. Des. 313,165.

While these devices fulfill their respective, particular objectives and requirements, the aforementioned patents do not disclose a new apparatus for arranging electrical cords. The inventive device includes a housing including an interior, a shaft that is mounted in the interior of the housing to receive at least one cord reeling assembly, and the cord reeling assembly that windably receives a cord of an electrical device and is mounted in the interior of the housing, a cord spool that is mounted on the shaft as part of the cord reeling assembly and includes a central portion and a pair of spaced flange portions that extend outward from the ends of the central portion, and an electrical power supply system that supplies electrical power to an electrical device having a cord wound about the cord spool.

In these respects, the apparatus for arranging electrical cords according to the present invention substantially departs from the conventional concepts and designs of the prior art, and in so doing provides an apparatus primarily developed for the purpose of storing the cords of electrical devices between uses of the electrical devices and dispensing the electrical cord from the housing during use of the electrical device.

SUMMARY OF THE INVENTION

In view of the foregoing disadvantages inherent in the known types of cord handling systems now present in the prior art, the present invention provides a new apparatus for arranging electrical cords construction wherein the same can be utilized for storing the cords of electrical devices between uses of the electrical devices and dispensing the electrical cord from the housing during use of the electrical device.

The general purpose of the present invention, which will be described subsequently in greater detail, is to provide a new apparatus for arranging electrical cords which has many of the advantages of the cord handling systems mentioned heretofore and many novel features that result in a new apparatus for arranging electrical cords which is not anticipated, rendered obvious, suggested, or even implied by any of the prior art cord handling systems, either alone or in any combination thereof.

To attain this, the present invention generally comprises a housing including an interior, a shaft that is mounted in the interior of the housing to receive at least one cord reeling assembly, and the cord reeling assembly that windably receives a cord of an electrical device and is mounted in the interior of the housing, a cord spool that is mounted on the shaft as part of the cord reeling assembly and includes a central portion and a pair of spaced flange portions that extend outward from the ends of the central portion, and an electrical power supply system that supplies electrical power to an electrical device having a cord wound about the cord spool.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new apparatus for arranging electrical cords which has many of the advantages of the cord handling systems mentioned heretofore and many novel features that result in a new apparatus for arranging electrical cords which is not anticipated, rendered obvious, suggested, or even implied by any of the prior art cord handling systems, either alone or in any combination thereof.

It is another object of the present invention to provide a new apparatus for arranging electrical cords which may be easily and efficiently manufactured and marketed.

It is a further object of the present invention to provide a new apparatus for arranging electrical cords which is of a durable and reliable construction.

An even further object of the present invention is to provide a new apparatus for arranging electrical cords which is susceptible of a low cost of manufacture with regard to both materials and labor, and which accordingly is then susceptible of low prices of sale to the consuming public, thereby making such apparatus for arranging electrical cords economically available to the buying public.

Still yet another object of the present invention is to provide a new apparatus for arranging electrical cords which provides in the apparatuses and methods of the prior art some of the advantages thereof, while simultaneously overcoming some of the disadvantages normally associated therewith.

Still another object of the present invention is to provide a new apparatus for arranging electrical cords for storing the cords of electrical devices between uses of the electrical devices and dispensing the electrical cord from the housing during use of the electrical device.

Yet another object of the present invention is to provide a new apparatus for arranging electrical cords which includes a housing including an interior, a shaft that is mounted in the interior of the housing to receive at least one cord reeling assembly, and the cord reeling assembly that windably receives a cord of an electrical device and is mounted in the interior of the housing, a cord spool that is mounted on the shaft as part of the cord reeling assembly and includes a central portion and a pair of spaced flange portions that extend outward from the ends of the central portion, and an electrical power supply system that supplies electrical power to an electrical device having a cord wound about the cord spool.

Still yet another object of the present invention is to provide a new apparatus for arranging electrical cords that permits the user to lengthen or shorten the amount of the cord as needed while using the electrical devices.

Even still another object of the present invention is to provide a new apparatus for arranging electrical cords that allows for the storage of several electrical devices in close proximity to each other without the electrical device cords becoming intertwined with each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
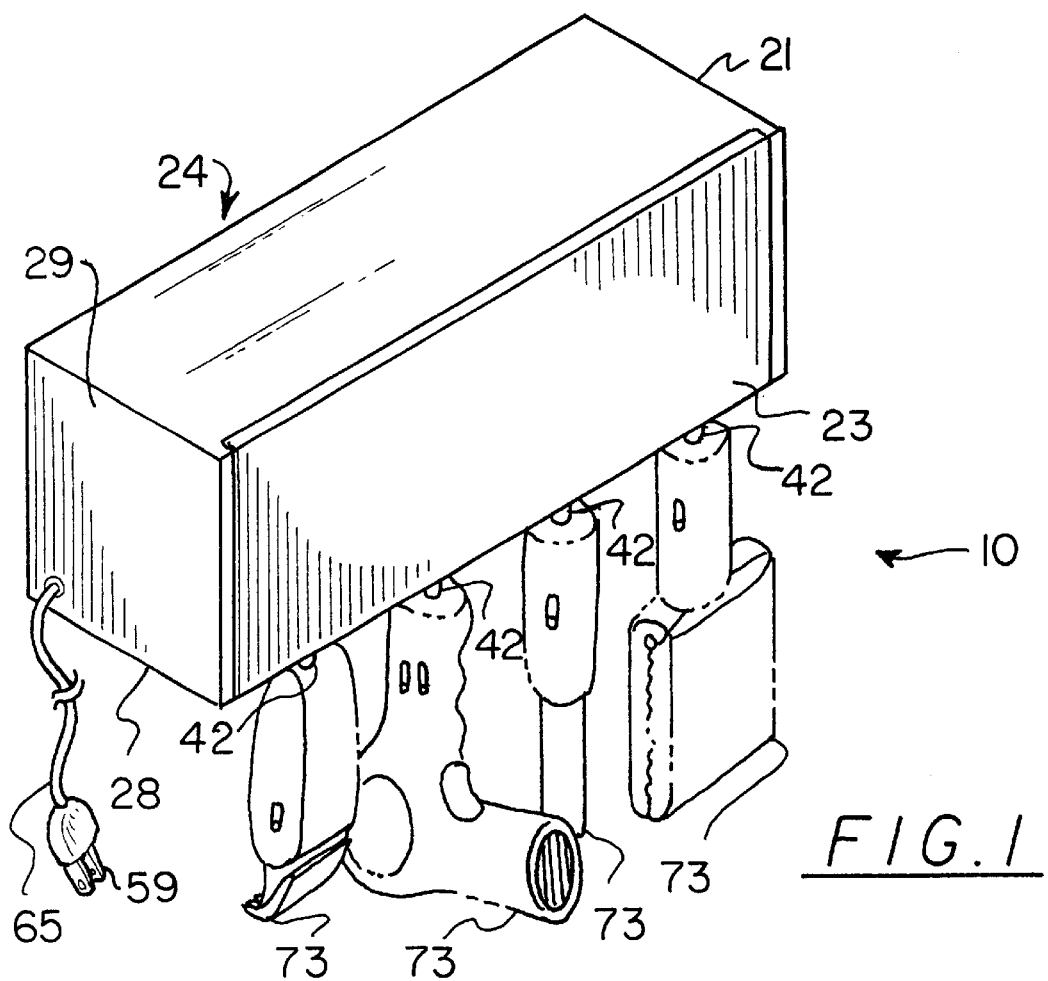
FIG. 1 is a schematic perspective view of a new apparatus for arranging electrical cords according to the present invention.
Figure 2:
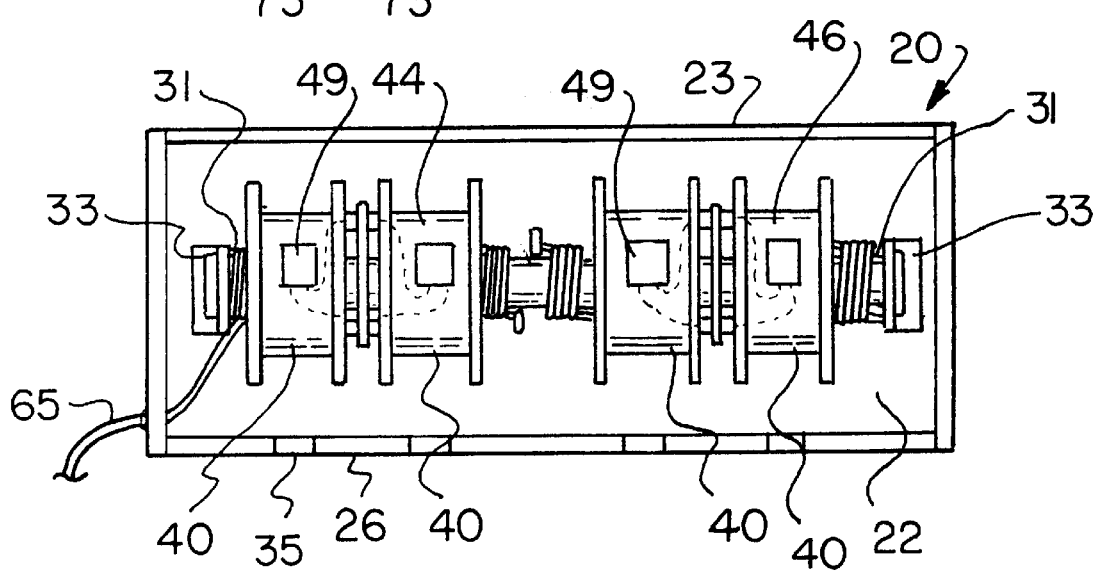
FIG. 2 is a schematic front view of the invention with the front wall of the housing pivoted at an open position.
Figure 3:
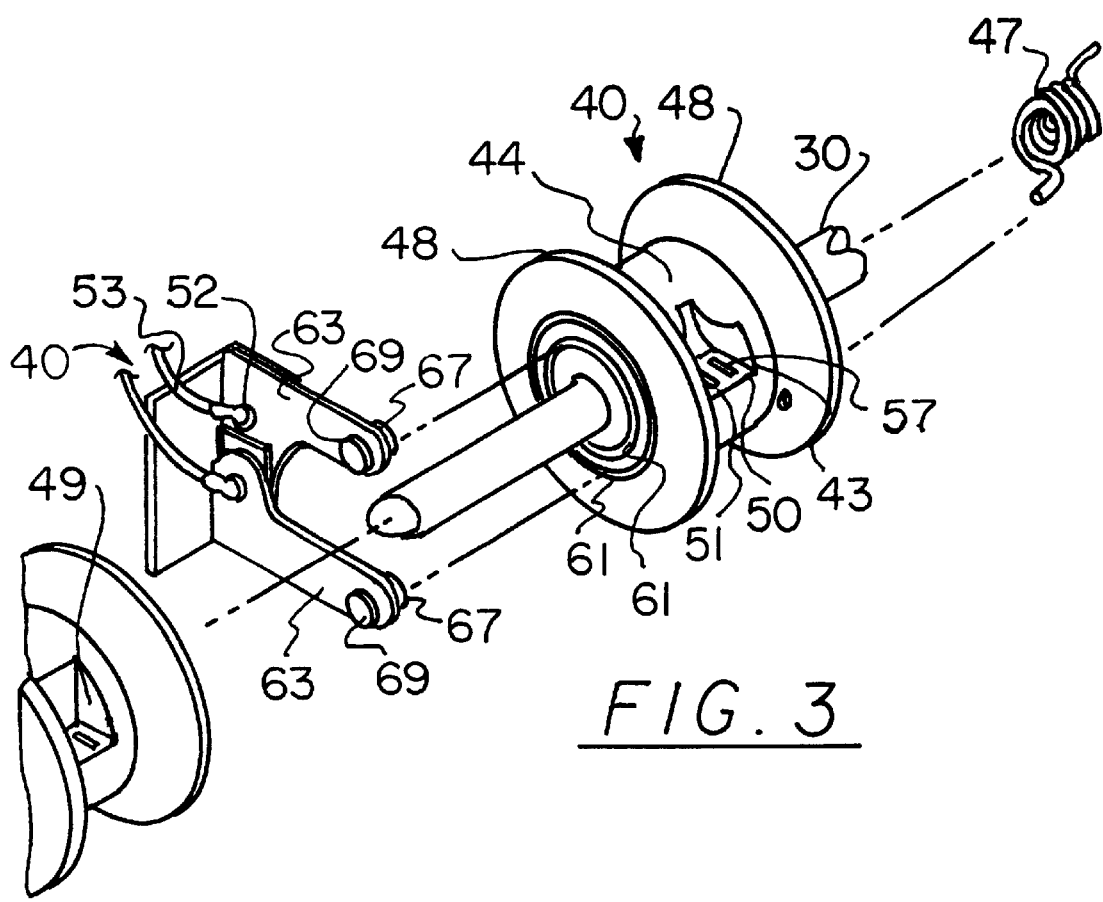
FIG. 3 is a schematic cross-section view of the cord reeling assembly of the present invention.
Figure 5:
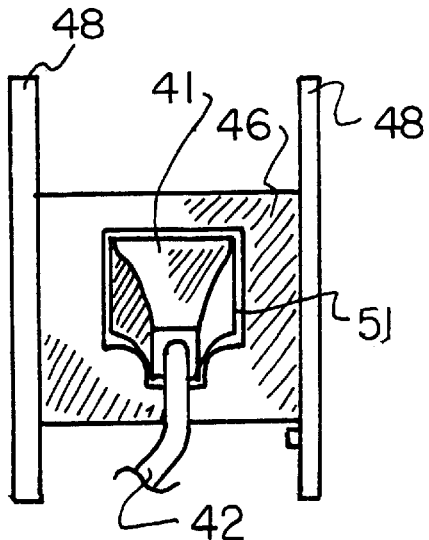
FIG. 5 is a schematic view of the electrical power supply of the present invention.
Figure 4:
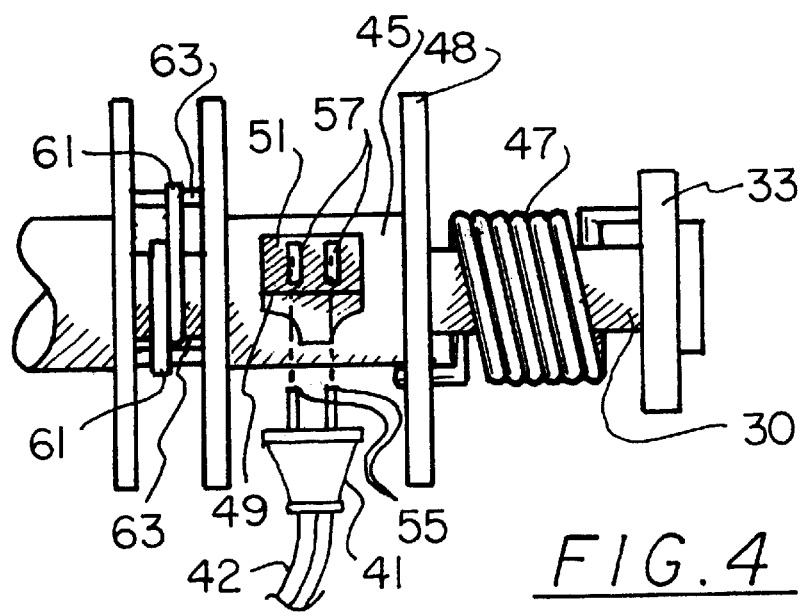
FIG. 4 is a schematic cross-section view taken along line 44 of FIG. 2 of the present invention.

With reference now to the drawings, and in particular to FIGS. 1 through 5 thereof, a new apparatus for arranging electrical cords embodying the principles and concepts of the present invention and generally designated by the reference numeral 10 will be described.

As best illustrated in FIGS. 1 through 5, the apparatus for arranging electrical cords 10 generally comprises a housing 20 including an interior 22, a shaft 30 and at least one cord reeling assembly 40 both mounted in the interior 22 of the housing 20, and the cord reeling apparatus including cord spools 44 mounted on the shaft 30.

The housing 20 includes an interior 22, a rear wall 24, a bottom wall 26, spaced side walls 28, a top wall 21, and a front wall 23. The rear wall 24 is designed for mounting to a vertical wall 25 to support the housing 20. The bottom wall 26 extends outwardly from the rear wall 24 and includes at least one cord aperture 35 extending through the bottom wall 26. The spaced side walls 28 extend outwardly from the rear wall 24. The front wall 23 is spaced from the rear wall 24 and is pivotally mounted to the top wall 21 of the housing 20.

A shaft 30 is mounted in the interior 22 of the housing 20 and extends between the end walls 29 of the housing 20. The shaft 30 includes opposite ends 31. The opposite ends 31 are each mounted on the rear wall 24 of the housing 20. A mounting bracket 33 is mounted to each end of the shaft 30 and to the rear wall 24 of the housing 20.

At least one cord reeling assembly 40 is mounted in the interior 22 of the housing 20 to windably receive a cord 42 of an electrical device. The cord reeling assembly 40 may includes a cord spool 44 that is rotatably mounted on the shaft 30. The cord spool 44 may include a substantially cylindrical central portion 46 and a pair of spaced flange portions 48 extending outward from ends of the central portion 46. A plug recess 49 may be formed in the central portion 46 for receiving a plug of an electrical device 41 and includes a plug abutting surface 43 oriented at an angle to a tangent to the surface of the central portion 46. A pair of ears may be mounted adjacent to the recess to form a cord retaining slot therebetween for receiving a cord while resisting unintentional removal of the plug from the recess when a cord is unreeled from the spool.

A biasing means 45 may comprise a torsion spring 47 situated around the shaft 30 for rotatably biasing the spool 44.

An electrical power supply system 50 supplies electrical power to an electrical device 73 through the cord 42 wound about the cord spool 44. The electrical power supply system 50 comprises a power socket 51 and a power transfer assembly 53. The power socket 51 receives the prongs 55 of a plug of an electrical cord, and includes a pair of prong slots 57 for receiving a prong of a power plug 59. The power socket 51 is formed in the plug recess 49 of the central cylinder 46.

The power transfer assembly 53 transfers electric power from a power supply 50 to the power socket 51. The power transfer assembly 53 comprises a pair of concentric rings 61, a pair of conductor arms 63, and a power cord 65. The pair of concentric rings 61 are mounted on one of the flanges 48 of the cord spool 44. Each of the concentric rings 61 is electrically connected to a prong slot of the power socket 51. The pair of conductor arms 63 electrically connects to an electrical power supply 50. Each conductor arm 63 includes a free end 67 with a contact 69 mounted thereon. The contact 69 on the free end 67 of the conductor arm 63 abuts one of the concentric rings 61 to permit electric flow between the contact 69 and the concentric arm 63. A power cord 65 is in electrical connection with the contacts 69 on the conductor arms 63 and extends out of the interior 22 of the housing 20.

A insulator plate formed of a non-conductive material may be interposed between the conductor arms to block short circuiting between the conductor arms, if the arms are formed of a conductive material.

In one preferred embodiment, a pair of cord spools 44 are mounted on the shaft 30 closely adjacent to each other. The pair of conductor arms 63 extend between one of the flanges 48 of each of the adjacent spools 44 such that the contact 69 on the free end 67 of each of the arms 63 contacts a concentric ring 61 of each of the flanges 48 of the adjacent spools 44.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for receiving and storing the cords of multiple electrical devices in a manner permitting use of the electrical devices without removing the cords from the apparatus, the apparatus comprising:

a housing having an interior;

a shaft mounted in the interior of the housing;

at least one cord reeling assembly for removably and windably receiving a cord of an electrical device positioned outside the interior of the housing, the cord reeling assembly being mounted in the interior of the housing, each cord reeling assembly comprising:

a cord spool rotatably mounted on the shaft, the cord spool having a central portion and a pair of spaced flange portions extending outward from ends of the central portion; and an electrical power supply system for supplying electrical power to an electrical device having a cord wound about the cord spool;

wherein the housing has a rear wall adapted for mounting to a vertical wall for supporting the housing;

wherein the housing has a bottom wall extending outwardly from the rear wall, the bottom wall having at least one cord aperture therethrough, the at least one cord aperture being located below the cord spool for permitting the cord wrapped about the cord spool to depend downwardly from the cord spool such that the electrical device on the cord is suspended below the bottom wall of the housing and the cord is dispensable from the housing by pulling downwardly on the electrical device.

2. The apparatus of claim 1 wherein the apparatus includes a plurality of cord reeling assembly, and wherein the bottom wall has a cord aperture for each of the plurality of cord reeling apertures.

3. The apparatus of claim 1 wherein the housing has a pivotally moveable front wall for permitting access to the interior of the housing.

4. The apparatus of claim 1 wherein the shaft has opposite ends mounted on the rear wall of the housing, a mounting bracket being mounted to each end of the shaft and to the rear wall of the housing.

5. The apparatus of claim 1 additionally comprising a biasing means for rotatably biasing the cord spool.

6. The apparatus of claim 1 wherein the biasing means comprises a torsion spring situated around the shaft.

7. The apparatus of claim 1 wherein a pair of cord spools are mounted on the shaft adjacent to each other with the pair of conductor arms extending between one of the flanges of each of the adjacent spools such that the contact on the free end of each of the arms contacts a concentric ring of each of the flanges of the adjacent spools.

8. The apparatus of claim 1 additionally comprising a plug recess being formed in the central portion of the cord spool for receiving a plug of an electrical device.

9. The apparatus of claim 8 wherein the plug recess has a plug abutting surface oriented at an angle to a tangent to the surface of the central portion.

10. The apparatus of claim 1 wherein the electrical power supply system includes a power socket for receiving the prongs of a plug of an electrical cord.

11. The apparatus of claim 10 wherein a plug recess is formed in the central portion of the cord spool for receiving a plug of an electrical device, and wherein the power socket is formed in the plug recess of the central cylinder, the power socket having a pair of prong slots for receiving a prong of a power plug.

12. The apparatus of claim 10 wherein the electrical power supply system includes a power transfer assembly for transferring electric power from a power supply to the power socket.

13. The apparatus of claim 12 wherein the transfer assembly comprises a pair of concentric rings mounted on one of the flanges of the cord spool, each of the concentric rings being electrically connected to a prong slot of the power socket.

14. The apparatus of claim 13 additionally comprising a pair of conductor arms for electrically connecting to an electrical power supply, each conductor arm contacting one of the concentric rings for transferring electrical power therebetween.

15. The apparatus of claim 14 wherein the conductor arms each have a free end with a contact mounted thereon, the contact on the free end of the conductor arm abutting one of the concentric rings for permitting electric flow between the contact and the concentric arm.

16. The apparatus of claim 15 wherein the electrical power supply system includes a power cord in electrical connection with the contacts on the conductor arms.

17. An apparatus for arranging the cords of electrical devices, comprising:

a housing having an interior, the housing having a rear wall adapted for mounting to a vertical wall for supporting the housing, the housing having a bottom wall extending outward from the rear wall, the bottom wall having at least one cord aperture extending through the bottom wall, the housing having spaced side walls extending outward from the rear wall, the housing having a top wall, the housing having a front wall spaced from the rear wall, the front wall being pivotally mounted to the top wall of the housing, the bottom wall having at least one cord aperture therethrough, the at least one cord aperture being located below the cord spool for permitting the cord wrapped about the cord spool to depend downwardly from the cord spool such that the electrical device on the cord is suspended below the bottom wall of the housing and the cord is dispensable from the housing by pulling downwardly on the electrical device;

a shaft mounted in the interior of the housing, the shaft having opposite ends, the opposite ends each being mounted on the rear wall of the housing, a mounting bracket being mounted to each end of the shaft and to the rear wall of the housing, the shaft extending between the end walls of the housing;

at least one cord reeling assembly for windably receiving a cord of an electrical device, the cord reeling assembly being mounted in the interior of the housing, each cord reeling assembly comprising:

a cord spool rotatably mounted on the shaft, the cord spool having a substantially cylindrical central portion and a pair of spaced flange portions extending outward from ends of the central portion, a plug recess being formed in the central portion for receiving a plug of an electrical device, the plug recess having a plug abutting surface oriented at an angle to a tangent to the surface of the central portion;

a biasing means for rotatably biasing the spool, the biasing means comprising a torsion spring situated around the shaft;

an electrical power supply system for supplying electrical power to an electrical device having a cord wound about the cord spool, including:

a power socket for receiving the prongs of a plug of an electrical cord, the power socket being formed in the plug recess of the central cylinder, the power socket having a pair of prong slots for receiving a prong of a power plug;

a power transfer assembly for transferring electric power from a power supply to the power socket, the transfer assembly comprising:

a pair of concentric rings mounted on one of the flanges of the cord spool, each of the concentric rings being electrically connected to a prong slot of the power socket; and a pair of conductor arms for electrically connecting to an electrical power supply, each conductor arm having a free end with a contact mounted thereon, the contact on the free end of the conductor arm abutting one of the concentric rings for permitting electric flow between the contact and the concentric arm;

a power cord in electrical connection with the contacts on the conductor arms, the power cord extending out of the interior of the housing; and wherein a pair of cord spools are mounted on the shaft adjacent to each other with the pair of conductor arms extending between one of the flanges of each of the adjacent spools such that the contact on the free end of each of the arms contacts a concentric ring of each of the flanges of the adjacent spools.

18. A system for storing multiple electrical devices, comprising:

at least one electrical device having an electrical supply cord attached thereto for supplying electrical power thereto;

an apparatus for receiving and storing the electrical supply cord of the at least one electrical device, the apparatus comprising:

a housing having an interior;

a shaft mounted in the interior of the housing;

at least one cord reeling assembly removably and windably receiving the electrical supply cord positioned outside the interior of the housing, the cord reeling assembly being mounted in the interior of the housing, each cord reeling assembly comprising:

a cord spool rotatably mounted on the shaft, the cord spool having a central portion and a pair of spaced flange portions extending outward from ends of the central portion; and an electrical power supply system for supplying electrical power to the electrical device having the cord wound about the cord spool;

wherein the housing has a rear wall adapted for mounting to a vertical wall for supporting the housing;

wherein the housing has a bottom wall extending outwardly from the rear wall, the bottom wall having at least one cord aperture therethrough, the at least one cord aperture being located below the cord spool such that the cord wrapped about the cord spool depends downwardly from the cord spool and the electrical device on the cord is suspended below the bottom wall of the housing and the cord is dispensable from the housing by pulling downwardly on the electrical device.

\* \* \* \* \*